(12) United States Patent
Tanugula et al.

(10) Patent No.: US 11,490,996 B2
(45) Date of Patent: *Nov. 8, 2022

(54) TREATMENT PLAN SPECIFIC BITE ADJUSTMENT STRUCTURES

(71) Applicant: ALIGN TECHNOLOGY, INC., San Jose, CA (US)

(72) Inventors: Rohit Tanugula, San Jose, CA (US); John Morton, San Jose, CA (US); Chunhua Li, Cupertino, CA (US); Bastien Pesenti, San Jose, CA (US); Jihua Cheng, San Jose, CA (US); Jeeyoung Choi, Sunnyvale, CA (US)

(73) Assignee: ALIGN TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/494,627

(22) Filed: Oct. 5, 2021

(65) Prior Publication Data

US 2022/0023010 A1 Jan. 27, 2022

Related U.S. Application Data

(60) Continuation of application No. 16/425,829, filed on May 29, 2019, now Pat. No. 11,141,243, which is a
(Continued)

(51) Int. Cl.
*A61C 7/36* (2006.01)
*A61C 7/00* (2006.01)
(Continued)

(52) U.S. Cl.
CPC ............... *A61C 7/36* (2013.01); *A61C 7/002* (2013.01); *A61C 7/08* (2013.01); *G06F 30/00* (2020.01)

(58) Field of Classification Search
CPC .. A61C 7/00; A61C 7/002; A61C 7/08; A61C 7/10; A61C 7/36; G06F 30/00
See application file for complete search history.

(56) References Cited

U.S. PATENT DOCUMENTS

| 5,975,893 | A | * | 11/1999 | Chishti | ................ A61C 9/004 |
| 6,364,659 | B1 | * | 4/2002 | Lotte | ....................... A61C 7/00 |
| | | | | | 433/18 |

(Continued)

FOREIGN PATENT DOCUMENTS

| CN | 102715957 A | * | 10/2012 |
| CN | 102715957 A | | 10/2012 |

*Primary Examiner* — Edward Moran
*Assistant Examiner* — Matthew P Saunders
(74) *Attorney, Agent, or Firm* — FisherBrloyes, LLP

(57) ABSTRACT

A series of appliances including a first shell and a second shell can be designed to incrementally implement a treatment plan. The first and second shells can have cavities designed to receive teeth of a jaw. A first number of bite adjustment structures can be formed of a same material as the first shell, extending therefrom and designed to interface with teeth of a second jaw. The first number of bite adjustment structures can have a first shape and location specific to a first stage of the treatment plan. A second number of bite adjustment structures can be formed of a same material as the second shell, extending therefrom and designed to interface with teeth of the second jaw. The second number of bite adjustment structures can have a second shape and location, different than the first shape and location, specific to a second stage of the treatment plan.

30 Claims, 11 Drawing Sheets

Related U.S. Application Data continuation of application No. 16/299,011, filed on Mar. 11, 2019, which is a division of application No. 14/186,799, filed on Feb. 21, 2014, now Pat. No. 10,299,894.

(51) Int. Cl.
*A61C 7/08* (2006.01)
*G06F 30/00* (2020.01)

(56) References Cited

U.S. PATENT DOCUMENTS

| | | | | |
|---|---|---|---|---|
| 6,530,375 | B1* | 3/2003 | Cieslik, Jr. | A61F 5/566 128/859 |
| 7,226,287 | B2* | 6/2007 | Abels | A61C 7/00 433/18 |
| 7,293,987 | B2* | 11/2007 | Abels | A61C 7/00 433/18 |
| 8,257,079 | B1* | 9/2012 | Plowman | A61C 7/36 433/18 |
| 8,297,286 | B2* | 10/2012 | Smernoff | A61C 9/0006 128/857 |
| 9,314,320 | B2* | 4/2016 | Urbanek | A63B 71/085 |
| 9,861,454 | B2* | 1/2018 | Heine | A61C 7/36 |
| 10,080,680 | B2* | 9/2018 | Magness | A61F 5/566 |
| 10,299,894 | B2* | 5/2019 | Tanugula | |
| 10,980,616 | B2* | 4/2021 | Tanugula | A61C 7/08 |
| 11,141,243 | B2* | 10/2021 | Tanugula | A61C 7/08 |
| 2002/0072027 | A1* | 6/2002 | Chishti | A61C 7/00 433/24 |
| 2002/0192617 | A1* | 12/2002 | Phan | A61C 19/003 433/18 |
| 2003/0139834 | A1* | 7/2003 | Nikolskiy | G06G 7/48 700/98 |
| 2003/0207224 | A1* | 11/2003 | Lotte | A61C 7/08 433/6 |
| 2004/0229183 | A1* | 11/2004 | Knopp | A61C 7/00 433/213 |
| 2006/0223023 | A1* | 10/2006 | Lai | A61C 7/00 433/24 |
| 2009/0191503 | A1* | 7/2009 | Matov | A61C 7/002 433/2 |
| 2010/0138025 | A1* | 6/2010 | Morton | A61C 7/00 700/103 |
| 2011/0005527 | A1* | 1/2011 | Andrew | A61C 7/36 128/848 |
| 2011/0129786 | A1* | 6/2011 | Chun | A61C 7/08 29/896.11 |
| 2011/0184762 | A1* | 7/2011 | Chishti | G06T 17/00 705/3 |
| 2013/0122448 | A1* | 5/2013 | Kitching | A61C 7/08 433/24 |
| 2014/0370465 | A1* | 12/2014 | Lucas | A61C 5/007 433/214 |
| 2015/0079531 | A1* | 3/2015 | Heine | A61C 7/08 433/19 |
| 2015/0132707 | A1* | 5/2015 | Huang | A61C 7/002 29/896.11 |
| 2015/0216626 | A1* | 8/2015 | Ranjbar | A61C 7/08 433/24 |
| 2015/0238280 | A1* | 8/2015 | Wu | A61C 7/36 433/24 |
| 2015/0238283 | A1* | 8/2015 | Tanugula | G06F 30/00 700/98 |
| 2015/0335404 | A1* | 11/2015 | Webber | B29C 51/34 264/16 |
| 2015/0336299 | A1* | 11/2015 | Tanugula | B29C 51/34 264/16 |
| 2016/0106521 | A1* | 4/2016 | Tanugula | A61C 7/08 433/6 |
| 2016/0199216 | A1* | 7/2016 | Cam | A61F 5/566 128/848 |
| 2017/0209238 | A9* | 7/2017 | Tanugula | A61C 7/36 |
| 2019/0175304 | A1* | 6/2019 | Morton | A61C 7/36 |
| 2020/0000557 | A1* | 1/2020 | Tanugula | G06F 30/00 |
| 2020/0100873 | A1* | 4/2020 | Tanugula | A61C 7/08 |
| 2020/0214801 | A1* | 7/2020 | Wang | A61C 7/002 |

\* cited by examiner

TREATMENT PLAN SPECIFIC BITE ADJUSTMENT STRUCTURES

RELATED APPLICATIONS

This application is a continuation of U.S. patent application Ser. No. 16/425,829, filed May 29, 2019, now U.S. Pat. No. 11,141,243, issued Oct. 12, 2021, which is a continuation of U.S. application Ser. No. 16/299,011, filed Mar. 11, 2019, which is a divisional of U.S. application Ser. No. 14/186,799, filed Feb. 21, 2014, now U.S. Pat. No. 10,299,894, issued May 28, 2019, which are incorporated herein by reference in their entirety and to which applications we claim priority under 35 USC § 120.

BACKGROUND

The present disclosure is related generally to the field of dental treatment. More particularly, the present disclosure is related to systems, methods, computing device readable media, and devices for treatment plan specific bite adjustment structures.

Dental treatments may involve, for instance, restorative and/or orthodontic procedures. Restorative procedures may be designed to implant a dental prosthesis (e.g., a crown, bridge inlay, onlay, veneer, etc.) intraorally in a patient. Orthodontic procedures may include repositioning misaligned teeth and changing bite configurations for improved cosmetic appearance and/or dental function. Orthodontic repositioning can be accomplished, for example, by applying controlled forces to one or more teeth over a period of time.

As an example, orthodontic repositioning may be provided through a dental process that uses positioning appliances for realigning teeth. Such appliances may utilize a thin shell of material having resilient properties, referred to as an "aligner," that generally conforms to a user's teeth but is slightly out of alignment with a current tooth configuration.

Placement of such an appliance over the teeth may provide controlled forces in specific locations to gradually move the teeth into a new configuration. Repetition of this process with successive appliances in progressive configurations can move the teeth through a series of intermediate arrangements to a final desired arrangement.

Such systems typically utilize materials that are light weight and/or transparent to provide as a set of appliances that can be used serially such that as the teeth move, a new appliance can be implemented to further move the teeth.

In various instances, a patient may have a malocclusion, where the patient's teeth do not line up properly. One example of a malocclusion is a deep bite, which is an acute case of an overbite where the patient's lower teeth are overlapped by the upper teeth and the lower incisors come into contact with the gingival tissue in the upper arch of the jaw. A deep bite can be an aesthetic problem and/or a problem with health consequences such as damage to the roots of the upper teeth, damage to the gingival tissue in the upper arch of the jaw, and/or wearing of the bottom teeth from frictional contact with the upper teeth, among others.

Some previous approaches to correcting a deep bite condition in a patient may include intrusion of the anterior (e.g., incisors and/or canines) teeth and/or extrusion of the posterior teeth (e.g., premolars and/or molars). Extrusion of the posterior teeth may be facilitated by the use of bite turbos (e.g., metal blocks adhered to a back (lingual) surface of the upper anterior teeth to reduce contact between posterior teeth in opposing jaws and allow for more eruption), anterior bite plates contacting the anterior dentition while allowing posterior eruption (e.g., in non-adult patients), twin blocks (e.g., blocks with an inclined occlusal plane are placed one on an upper dentition and one on a lower dentition to reduce contact between posterior teeth), among others. However, extrusion of posterior teeth in adult patients may lead to unstable results. Intrusion of the anterior teeth may be facilitated by anchor bend (e.g., metal anchors on the molars that are used to apply an upward force to the incisors), J-hook headgear, expansion screws, bypass archwires that bypass premolars and/or canines to maintain reduced forces by lengthening the span between molars and incisors, among others. Another previous approach to correcting a deep bite condition in a patient may be orthognathic surgical correction.

DETAILED DESCRIPTION

Figure 1:
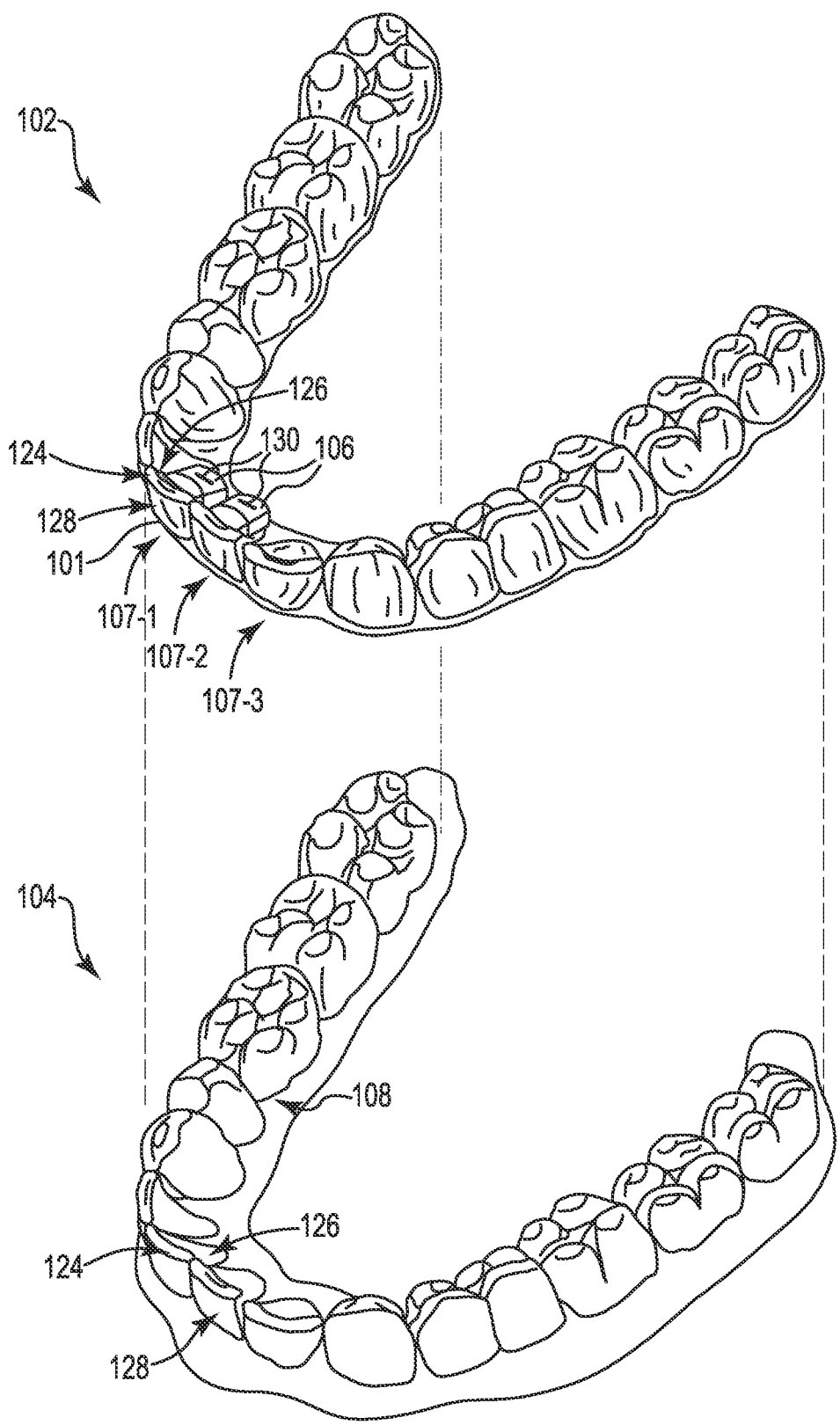
FIG. 1 illustrates a perspective view of a dental position adjustment appliance including a number of bite adjustment structures being applied to a set of teeth according to one or more embodiments of the present disclosure.

In contrast to some previous approaches, a number of embodiments of the present disclosure feature a dental positioning appliance (e.g., aligner) including a number of bite adjustment structures positioned thereon in a treatment specific fashion. For example, the bite adjustment structures can be placed according to a stage of treatment associated with the appliance. One, several, or all of a series of appliances can include bite adjustment structures that are positioned (e.g., with a shape and location) that is specific to a respective stage of a treatment plan associated with each appliance. In some embodiments, the bite adjustment structures can be formed of a same material as the appliance and/or formed at a same time as the appliance.

In the following detailed description of the present disclosure, reference is made to the accompanying drawings that form a part hereof, and in which is shown by way of illustration how a number of embodiments of the disclosure may be practiced. These embodiments are described in sufficient detail to enable those of ordinary skill in the art to practice the embodiments of this disclosure, and it is to be understood that other embodiments may be utilized and that process and/or structural changes may be made without departing from the scope of the present disclosure. As used herein, "a number of" a particular thing can refer to one or more of such things (e.g., a number of bite adjustment structures can refer to one or more bite adjustment structures).

The figures herein follow a numbering convention in which the first digit or digits correspond to the drawing figure number and the remaining digits identify an element or component in the drawing. Similar elements or components between different figures may be identified by the use of similar digits. For example, 106 may reference element "06" in FIG. 1, and a similar element may be referenced as 606 in FIG. 6. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

FIG. 1 illustrates a perspective view of a dental position adjustment appliance 102 including a number of bite adjustment structures 106 being applied to a set of teeth 104 according to one or more embodiments of the present disclosure. Appliances according to the present disclosure can include, in some embodiments, a plurality of incremental dental position adjustment appliances. The appliances, such as appliance 102 illustrated in FIG. 1, can be utilized to incrementally implement a treatment plan such as by affecting incremental repositioning of individual teeth in the jaw, among other suitable uses. Appliances, such as appliance 102, can be fabricated according to a virtual dental model that has had positions of a number of teeth adjusted according to one or more embodiments of the present disclosure.

Appliances can include any positioners, retainers, and/or other removable appliances for finishing and maintaining teeth positioning in connection with a dental treatment. These appliances may be utilized by the treatment professional in performing a treatment plan. For example, a treatment plan can include the use of a set of appliances, created according to models described herein.

An appliance (e.g., appliance 102 in FIG. 1) can, for example, be fabricated from a polymeric shell, and/or formed from other material, having a plurality of cavities therein (e.g., cavity 107-1, cavity 107-2, generally referred to herein as cavities 107). The cavities 107 can be designed (e.g., shaped) to receive one or more teeth 104 and/or apply force to reposition one or more teeth 104 of a jaw from one teeth arrangement to a successive teeth arrangement. The shell may be designed to fit over a number of, or in many instances all, teeth 104 present in the upper and/or lower jaw.

The appliance 102 can include a number of bite adjustment structures 106 formed of a same material as the shell. In some embodiments, the bite adjustment structures 106 can be formed of the same material as the shell as a continuous body. The bite adjustment structures 106 can be formed at a same time as the shell (e.g., from a same bulk material), such as during a vacuum forming process, where the material is vacuum formed over a model of teeth that is formed based on data representing a user's teeth.

The shell can include cavities 107 (e.g., where each cavity 107 corresponds to a tooth). The bite adjustment structures 106 can be a part of a cavity 107. A cavity, such as cavity 107-3, that does not include a bite adjustment structure 106 can be shaped to mate with a particular tooth. For example, cavity 107-3 can be shaped to mate with three surfaces of a corresponding tooth to be received therein. The three surfaces can be a front (facial) surface 128, a back (lingual) surface 126, and a biting (incisal) surface 124. The cavity 107-3 may be slightly out of alignment with a current configuration of the particular tooth (e.g., to facilitate aligning the particular tooth to a desired configuration), but the cavity 107-3 can generally conform to the shape of the particular tooth such that there is not much space between the cavity 107-3 and the particular tooth when the appliance 102 is worn.

Figure 7A:
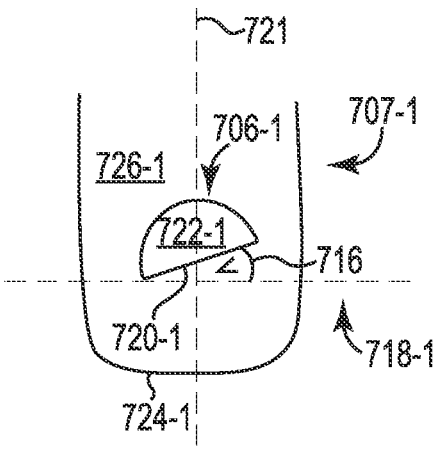
FIG. 7A illustrates a cross-section taken along cut line 7A-7A of a portion of the appliance illustrated in FIG. 6 according to a number of embodiments of the present disclosure.
Figure 7B:
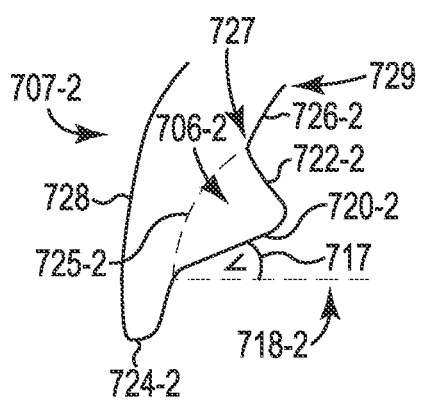
FIG. 7B illustrates a cross-section taken along cut line 7B-7B of a portion of the appliance illustrated in FIG. 6 according to a number of embodiments of the present disclosure.
Figure 7C:
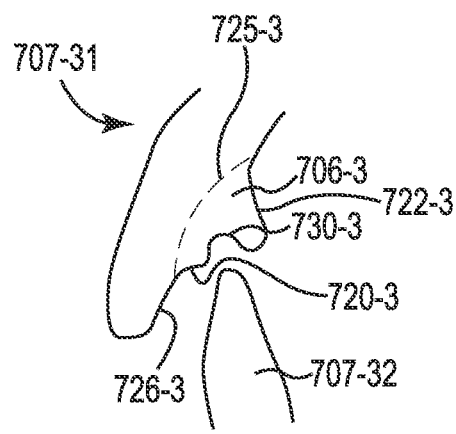
FIG. 7C illustrates a cross-section analogous to the cross-section illustrated in FIG. 7B of a portion of a first appliance and a second appliance according to a number of embodiments of the present disclosure.

In contrast, a cavity, such as cavity 107-1, that includes a bite adjustment structure 106 can be shaped to mate with two surfaces of a particular tooth. For an incisor or canine, the two surfaces can be a front (facial) surface 128 and a biting (incisal) surface 124. The back surface (lingual) surface 126 of the cavity 107-1 can include the bite adjustment structure 106 extending therefrom. The bite adjustment structure 106 can form a part of the cavity 107-1 such that when worn over a particular tooth, space exists between the tooth and the bite adjustment structure 106. FIGS. 7B and 7C illustrate this space in more detail.

The bite adjustment structures 106 can extend from the appliance 102 toward the back of the mouth (in a facial-lingual direction) and be designed to interface with teeth of the jaw opposing the jaw over which the appliance 102 is intended to be worn. For example, the appliance 102 can be designed to fit over teeth in a user's upper jaw and the bite adjustment structures 106 can be designed to interface with teeth of the user's lower jaw. The shape (e.g., size and/or contours, angle(s), etc.) and location (e.g., position on the cavity) of each of the bite adjustment structures 106 can be specific to a stage of a treatment plan for which the appliance 102 was designed. For example, successive appliances created according to a treatment plan may have differently shaped and/or located bite adjustment structures 106. A particular bite adjustment structure 106 can have a shape and location specific to a particular stage of the treatment plan based on at least one of an interface with a particular tooth of an opposing jaw, an intended use, and an orientation of a tooth over which the bite adjustment structure 106 is positioned. Bite adjustment structures 106 that have shapes and locations specific to particular stages of treatment can be advantageous over some previous approaches that use generic and/or uniform attachments that are not specific to treatment stages and therefore may not accurately provide the desired correction for the treatment stage during which they are used. Such inaccurate treatment can lead to lengthening treatment plans, a need for a revised treatment plan, and/or unnecessary user discomfort, among other drawbacks. In contrast a number of embodiments of the present disclosure allow for more timely, accurate, and/or comfortable execution of treatment plans.

In some embodiments, an edge 101 of a cavity 107 opposite the biting (incisal) surface 124 of the cavity 107 can be shaped to extend beyond a gingival line 108 of the user. Extending portions of the shell over the gingival line 108 of the jaw can help to distribute a counterforce (e.g., counter to a number of forces applied to the bite adjustment structures 106) to other portions of the jaw.

Although not specifically illustrated, in some embodiments, for a particular stage in a treatment plan, both an upper appliance (an appliance designed to fit over teeth of a user's upper jaw) and lower appliance (an appliance designed to fit over teeth of a user's lower jaw) can include a number of bite adjustment structures. A particular stage in a treatment plan can include bite adjustment structures on only one of an upper appliance and a lower appliance. A particular stage in a treatment plan may not include any bite adjustment structures on either an upper appliance or a lower appliance. A particular stage in a treatment plan can include bite adjustment structures on cavities corresponding to incisors, canines, premolars, and/or molars, and/or any combination thereof.

Bite adjustment structures on the upper appliance can be designed to interface with teeth of the lower jaw and the bite adjustment structures on the lower appliance can be designed to interface with teeth of the upper jaw. As used herein, a bite adjustment structure being "designed to interface with teeth of an opposing jaw" can mean that the bite adjustment structure is designed to interface with teeth of an opposing jaw that are or are not covered by another appliance. In some embodiments, a bite adjustment structure on a cavity of a first appliance can be designed to interface with a corresponding providing structure on a cavity of a second appliance over an opposing jaw (e.g., as illustrated and described with respect to FIG. 7D).

An upper appliance can include a number of bite adjustment structures 106 on a back (e.g., lingual) side of cavities 107 designed to receive upper anterior teeth. The number of bite adjustment structures 106 can interface with lower anterior teeth and receive an inherent force therefrom when a user bites (e.g., so as to provide a disocclusion between posterior teeth of the user). In some embodiments, the appliance 102 can be designed to selectively distribute a counterforce (counter to an inherent force generated by the user's biting) to the posterior upper dentition.

The bite adjustment structures 106 can be designed to provide a disocclusion between opposing jaws. Providing a disocclusion between opposing jaws can allow for adjustment (e.g., correction) a vertical relationship between the upper and lower jaws. That is, the bite adjustment structures 106 can be designed and intended for adjustment of the vertical relationship between upper and lower jaws and/or a vertical relationship between respective teeth in the upper and lower jaws. In some embodiments, the appliance 102 can be designed to reposition a number of teeth 104 over which the appliance 102 is worn while the bite adjustment structures 106 provide a disocclusion between opposing jaws. Providing a disocclusion between opposing jaws can help prevent appliances on opposing jaws from interacting (e.g., touching, allowing interaction of forces, etc.) with each other (e.g., except at the bite adjustment structures 106). Providing a disocclusion between opposing jaws can adjust an occlusal plane (e.g., a global occlusal plane) of the user. Such an adjustment can be temporary (e.g., while the appliance 102 is worn) and/or more permanent (e.g., by allowing for extrusion of teeth such as molars). For example, the bite adjustment structures 106 can be designed to provide a disocclusion between opposing posterior teeth when the user bites (e.g., in some instances, a number of anterior teeth of the user may contact a bite adjustment structure 106 on an appliance worn over an opposing jaw, which can prevent the user's posterior teeth from occluding). As used herein, "disocclusion" includes the provision of space between corresponding teeth of opposing jaws so that the teeth do not bind with and/or contact each other.

Figure 2:
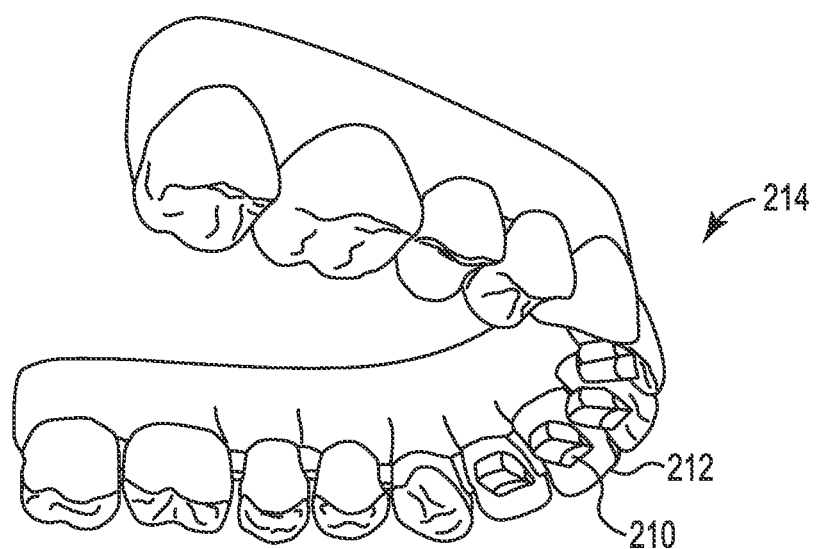
FIG. 2 illustrates a perspective view of a digital model of a jaw including a number of bite adjustment structures positioned on incisors according to a number of embodiments of the present disclosure.

FIG. 2 illustrates a perspective view of a digital model 214 of a jaw including a number of bite adjustment structures 210 positioned on incisors according to a number of embodiments of the present disclosure. A number of embodiments of the present disclosure include instructions that are executable by a processor (e.g., software), which can be fixed in a non-transitory computing device readable medium, to model a user's jaws (e.g., including teeth, roots, gingiva, and/or supporting structure, etc.). The instructions can be executed to create and/or modify a treatment plan to incrementally adjust the user's teeth and/or bite, among other adjustments, via application of a series of appliances as described herein. The instructions can be executed to provide modified models of the user's jaws for each of the various stages of the treatment plan for fabrication (e.g., via rapid prototyping such as stereolithography) of physical models corresponding to the digital models 214. The physical models can be used for the fabrication (e.g., via thermoforming) of appliances thereover.

According to a number of embodiments of the present disclosure, the instructions can be executed to position a number of digital bite adjustment structures 210 on a corresponding number of digital teeth 212 of a digital model 214 of a jaw. The instructions can be executed to position the digital bite adjustment structures 210 on the digital teeth of the digital model 214 of the jaw at a particular stage of treatment and/or adjust a position of the digital bite adjustment structures 210 for subsequent stages of treatment. The digital model 214 of the jaw can be different at each stage of treatment according to the treatment plan (e.g., positioning of the digital teeth can change). The instructions can be executed to adjust the position of the digital bite adjustment structures 210 according to changes to the digital model 214 of the jaw between treatment stages and/or according to anticipated changes in subsequent stages of treatment (e.g., to help effectuate a desired change to the digital model 214 of the jaw).

For each stage of treatment, the instructions can be executed to model forces applied to the digital model 214 of the jaw by an appliance corresponding to that stage (to simulate actual forces to be applied to a user's physical jaw by a physical appliance). Those forces can include forces applied to the digital model 214 of the jaw by virtue of the appliance being slightly out of alignment with a current configuration of the digital teeth and/or include inherent forces applied to the aligner by the user (e.g., when the user bites on the bite adjustment structures). The instructions can be executed to adjust the shape of the digital model 214 of the jaw such that a corresponding appliance formed thereover distributes a counterforce (counter to the inherent force applied by the user to the bite adjustment structures) to a number of posterior teeth of the physical jaw of the user.

Any of the number of digital models illustrated and/or described herein (e.g., FIGS. 2, 3A-3D, 4, 5, etc.) can represent a stage of a treatment plan, can be used to model forces applied to the digital models, can be used to create a physical model for formation of a physical appliance thereover, can be used for direct fabrication of a physical appliance (without creating a physical model), among other uses.

Positioning and/or adjustment of positioning of digital bite adjustment structures 210 on a digital model 214 of a jaw can be automatic (e.g., by operation of software based on force modeling for a particular stage of treatment), manual (e.g., by operation of an operator interacting with the digital model via an interface with a computing device), or a combination thereof. Likewise, the shape (e.g., size, orientation (e.g., various angles with respect to references)) and/or attachment location (on the digital teeth) of the digital bite adjustment structures 210 can be automatically set by the software, by manual operation (e.g., an operator can specify the necessary criteria of the digital bite adjustment structures 210 and/or modify default criteria provided by the software), or a combination thereof.

As described herein, the bite adjustment structures can be used to provide a disocclusion and/or adjust canine guidance, among other uses. The instructions to position the digital bite adjustment structures 210 can incorporate a result of instructions to model forces used to reposition digital teeth 212. For example, the instructions can be executed to model a first number of forces used to reposition a corresponding number of digital teeth 212 a first distance according to a first stage ("first" indicating an arbitrary stage, not necessarily an original stage) of a treatment plan and the instructions can be executed to incorporate a result of modeling the first number of forces in order to position the digital bite adjustment structures 212. The instructions executed to adjust a position of the digital bite adjustment structures 212 can incorporate a result of instructions executed to calculate a second number of forces used to reposition the number of digital teeth 212 a second distance according to a second stage of the treatment plan (e.g., a stage subsequent to the first stage, not necessarily sequential thereto).

According to a number of embodiments of the present disclosure, physical bite adjustment structures do not need to be attached to a user's physical teeth in order to fabricate appliances that include bite adjustment structures therein. With digital modeling, an impression of the user's teeth (without physical attachments) can be made and the digital bite adjustment structures 210 can be added by software. Such embodiments can be beneficial in reducing chair time for users in a professional's office and/or reduce the use of materials associated with physical attachments, which can reduce costs. Such embodiments can be beneficial in reducing user discomfort that may be associated with physical attachments, even if the physical attachments are temporary.

Figure 3A:
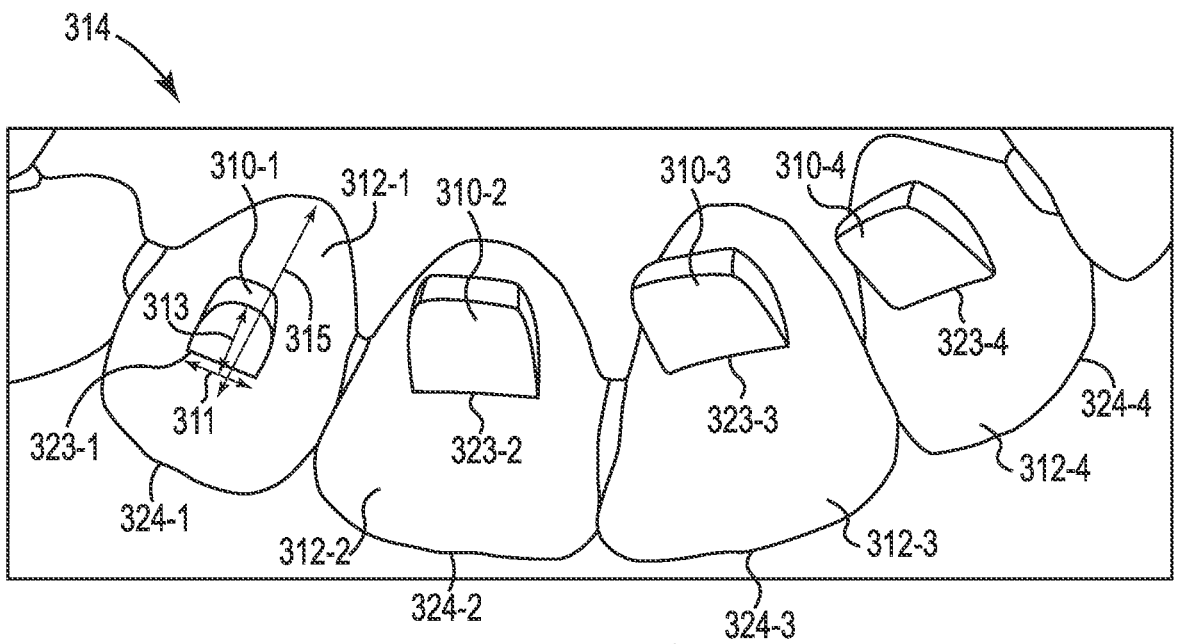
FIG. 3A illustrates a perspective view of a portion of a digital model of a jaw corresponding to a first stage of treatment including a number of digital bite adjustment structures positioned thereon according to a number of embodiments of the present disclosure.

FIG. 3A illustrates a perspective view of a portion of a digital model 314 of a jaw corresponding to a first stage of treatment including a number of digital bite adjustment structures 310 positioned thereon according to a number of embodiments of the present disclosure. The digital model 314 includes a number of digital teeth 312-1, 312-2, 312-3, 312-4 (e.g., incisors) that each include a corresponding digital bite adjustment structure 310-1, 310-2, 310-3, 310-4.

Figure 3B:
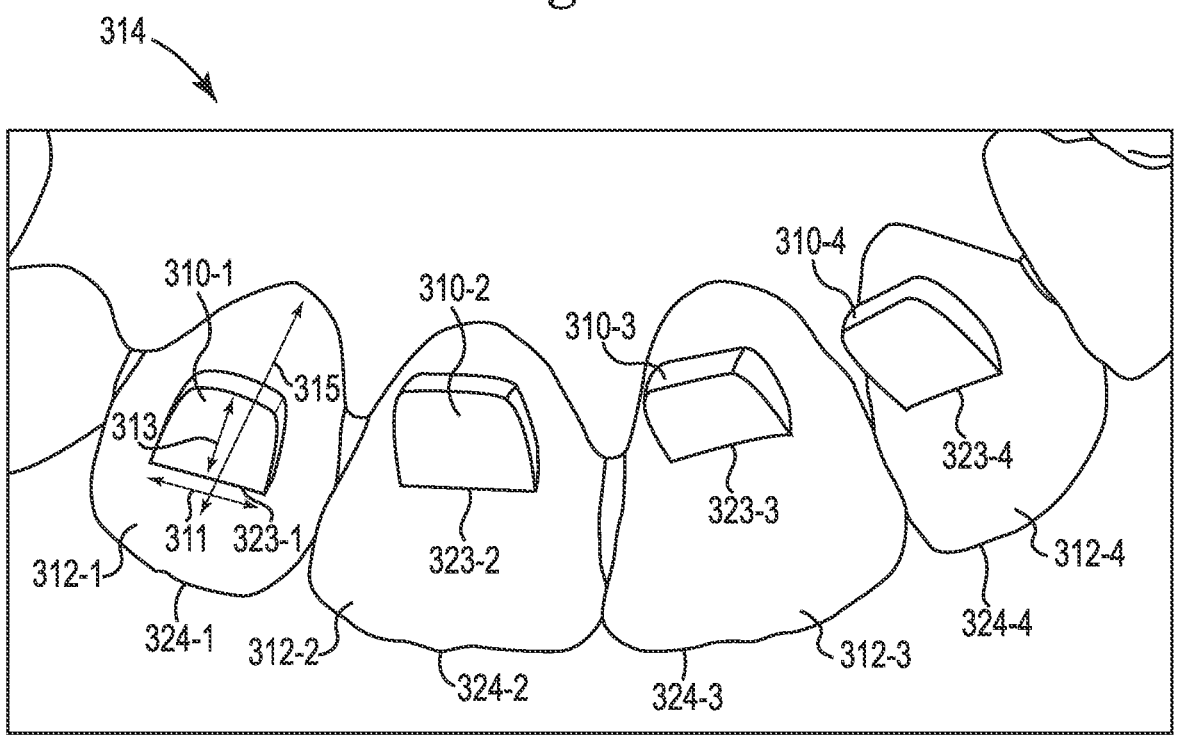
FIG. 3B illustrates a perspective view of a portion of a digital model of a jaw corresponding to a second stage of treatment including a number of digital bite adjustment structures positioned thereon according to a number of embodiments of the present disclosure.
Figure 3C:
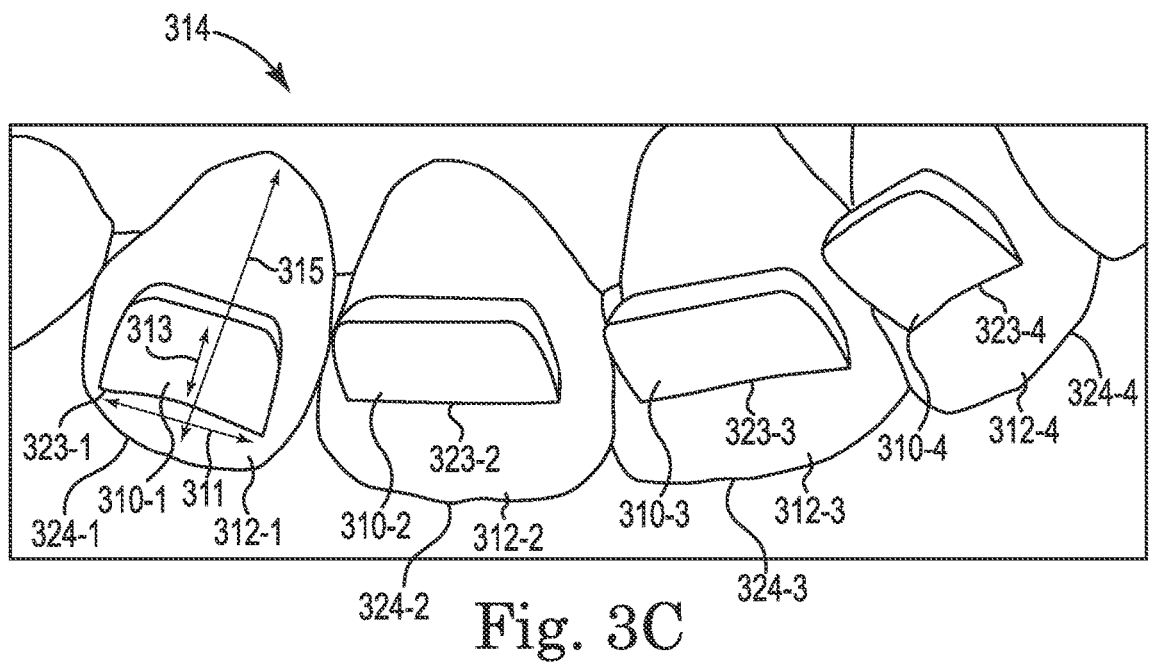
FIG. 3C illustrates a perspective view of a portion of a digital model of a jaw corresponding to a third stage of treatment including a number of digital bite adjustment structures positioned thereon according to a number of embodiments of the present disclosure.
Figure 3D:
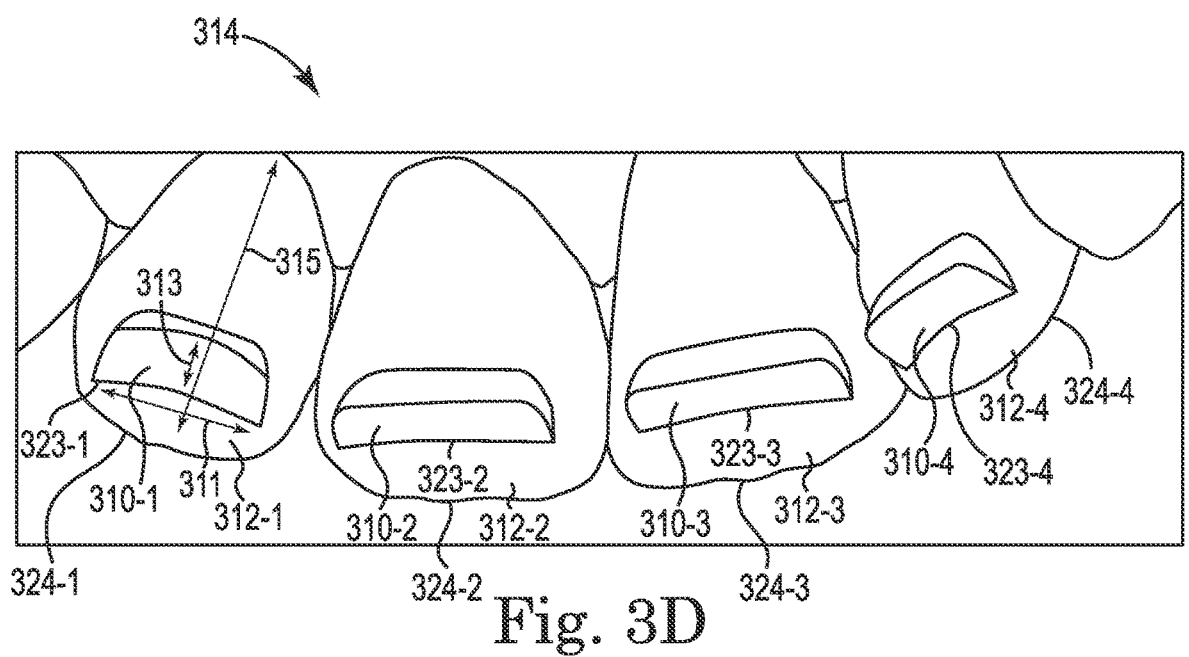
FIG. 3D illustrates a perspective view of a portion of a digital model of a jaw corresponding to a fourth stage of treatment including a number of digital bite adjustment structures positioned thereon according to a number of embodiments of the present disclosure.

FIG. 3B illustrates a perspective view of a portion of a digital model 314 of a jaw corresponding to a second stage of treatment including a number of digital bite adjustment structures 310 positioned thereon according to a number of embodiments of the present disclosure. FIG. 3C illustrates a perspective view of a portion of a digital model 314 of a jaw corresponding to a third stage of treatment including a number of digital bite adjustment structures 310 positioned thereon according to a number of embodiments of the present disclosure. FIG. 3D illustrates a perspective view of a portion of a digital model 314 of a jaw corresponding to a fourth stage of treatment including a number of digital bite adjustment structures 310 positioned thereon according to a number of embodiments of the present disclosure.

"First stage" does not necessarily mean the original stage of a treatment plan, but is a relative term with respect to other stages. For example, the "first stage" may be a second stage of a 50 stage treatment plan, while the "second stage" illustrated in FIG. 3B may be a tenth stage of the 50 stage treatment plan, while the "third stage" illustrated in FIG. 3C may be a 30th stage of the 50 stage treatment plan, and the "fourth stage" illustrated in FIG. 3D may be a 40th stage of the 50 stage treatment plan.

Embodiments can include more or fewer bite adjustment structures 310 than are illustrated in FIGS. 3A-3D. For example, some treatment plans may include four bite adjustment structures 310 for a first stage and two bite adjustment structures for a second stage. Each of the bite adjustment structures 310 can have a shape and location specific to the respective stage of the treatment plan.

FIG. 3A includes a first digital tooth 312-1 with a first digital bite adjustment structure 310-1 that is smaller than a second digital bite adjustment structure 310-2 on a second digital tooth 312-2. The first digital bite adjustment structure 310-1 is smaller than the second digital bite adjustment structure 310-2 in both a direction between adjacent teeth in the same jaw (mesial-distal direction) 311 and in a direction between the front of the mouth and the back of the mouth (facial-lingual direction) 313. In some embodiments, different bite adjustment structures can have different sizes in a direction between the root and the tip of a tooth (gingival-incisal/coronal direction) 315. The first digital bite adjustment structure 310-1 is smaller than a third digital bite adjustment structure 310-3 on a third digital tooth 312-3 and smaller than a fourth digital bite adjustment structure 310-4 on a fourth digital tooth 312-4. The third digital bite adjustment structure 310-3 is approximately the same size as the second digital bite adjustment structure 310-2. The fourth digital bite adjustment structure is smaller than the second digital bite adjustment structure 310-2 and the third digital bite adjustment structure 310-3, but larger than the first digital bite adjustment structure 310-1. Bite adjustment structures can have different angles as illustrated and described in more detail with respect to FIGS. 7A-7B.

A bite adjustment structure can be designed with a different (e.g., smaller) size, for example, as corresponding teeth of opposing jaws get closer together during treatment. A bite adjustment structure can be designed with a different (e.g., larger) size, for example, as corresponding teeth of opposing jaws get farther apart during treatment. A bite adjustment structure can have a smaller or larger size in a direction between adjacent teeth in the same jaw (mesial-distal direction) 311 dependent upon proximity to one or more adjacent teeth (e.g., a bite adjustment structure can be designed to be smaller/larger to account for crowding/spacing so that the bite adjustment structure does not interfere with neighboring teeth).

A bite adjustment structure can be designed to be in a different location on a tooth for different stages of treatment. As illustrated between FIG. 3B and FIG. 3C, an edge 323-1 of the digital bite adjustment structure 310-1 that is closest to the biting (incisal) surface 324-1 moved closer to the biting (incisal) surface 324-1 of the digital tooth 312-1. Furthermore, the digital bite adjustment structure 310-1 increased in size in both a direction between adjacent teeth in the same jaw (mesial-distal direction) 311 and a direction between the root and the tip of a tooth (gingival-incisal/coronal direction) 315 between the second stage and the third stage. Bite adjustment structures can be designed to change location on a tooth between treatment stages based on, for example, changes in intrusion or extrusion of the tooth (or a corresponding tooth on an opposing jaw) and/or movement of the tooth (or a corresponding tooth on an opposing jaw) (e.g., movement in a direction between adjacent teeth in the same jaw (mesial-distal direction) 311). For example, if a tooth is intruded during treatment, a bite adjustment structure for that tooth may be moved toward a biting (incisal) surface of the tooth in a subsequent stage of treatment to allow a corresponding tooth on the opposing jaw to continue to make contact with the bite adjustment structure. As used herein, "intrusion" includes forcing a tooth back into a jaw and/or preventing eruption of the tooth from the jaw.

Across FIGS. 3A-3D, the edges 323-1, 323-2, 323-3, 323-4 of the digital bite adjustment structures 310-1, 310-2, 310-3, 310-4 closest to the biting (incisal) surfaces 324-1, 324-2, 324-3, 324-4 of the teeth generally change location toward the biting (incisal) surfaces 324-1, 324-2, 324-3, 324-4 of the digital teeth 312-1, 312-2, 312-3, 312-4. Such a change in location can be designed for the digital bite adjustment structures 310-1, 310-2, 310-3, 310-4, for example, as part of a treatment plan where the digital teeth 312-1, 312-2, 312-3, 312-4 are being intruded into the jaw (as the teeth move up into the jaw, an occlusal plane defined by contact with the corresponding teeth on the opposing jaw would generally move in the direction between the root and the tip of a tooth (gingival-incisal/coronal direction) 315 toward the biting (incisal) surfaces 324-1, 324-2, 324-3, 324-4 of the digital teeth 312-1, 312-2, 312-3, 312-4).

Figure 4:
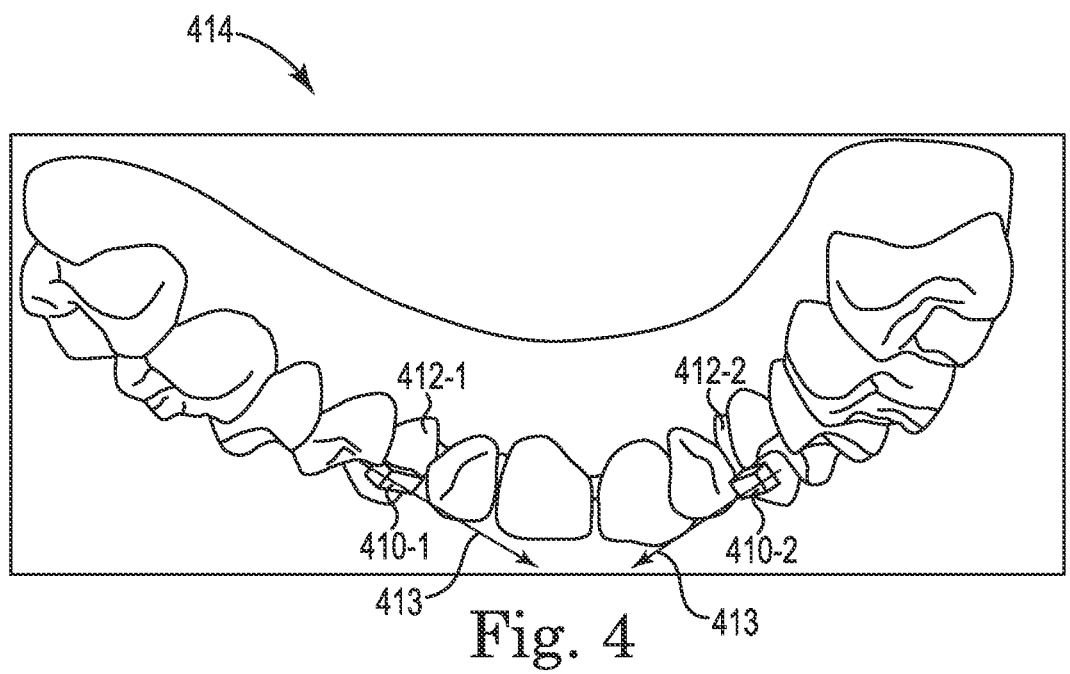
FIG. 4 illustrates a perspective view of a digital model of a jaw including a number of digital bite adjustment structures positioned on digital canines according to a number of embodiments of the present disclosure.

FIG. 4 illustrates a perspective view of a digital model 414 of a jaw including a number of digital bite adjustment structures 410-1, 410-2 positioned on digital canines 412-1, 412-2 according to a number of embodiments of the present disclosure. Appliances (e.g., formed based on digital model 414) that include bite adjustment structures on canines can be used to provide a disocclusion between various opposing teeth in a user's jaws while the appliance is worn (e.g., to allow for eruption of teeth or other treatment goals).

The digital bite adjustment structures 410 can extend from the digital canines 412 in a direction from the outside of the mouth toward an inside of the mouth (facial-lingual) direction 413. Because the digital bite adjustment structures 410 are extending from digital canines 412, the digital bite adjustment structures 410 are likely (depending on specific patient tooth geometry and alignment) to extend in a direction oblique to the occlusal plane. Although the angle of each digital bite adjustment structure can be specific to the particular digital tooth from which it extends, and patient tooth geometries and alignments will differ, digital bite adjustment structures extending from digital incisors (e.g., FIG. 2) may be more closer to being parallel to the occlusal plane, digital bite adjustment structures extending from digital molars and/or premolars (e.g., FIG. 5) may be closer to being perpendicular to the occlusal plane, and digital bite adjustment structures extending from digital canines (e.g., FIG. 4) may be closer to being oblique to the occlusal plane.

According to a number of embodiments of the present disclosure, the digital bite adjustment structures 410 can be positioned on a corresponding number of digital teeth 412 of a digital model 414 of a jaw at a particular stage of treatment. The position of the digital bite adjustment structures 410 can be adjusted for subsequent stages of treatment (e.g., to help effectuate a desired change to the digital model 414 of the jaw). For example, bite adjustment structures on cavities of an appliance over a canine can be used to adjust canine guidance. Canine guidance is a feature of the canines that helps to prevent contact of posterior teeth of opposing jaws when the lower jaw slides sideways (e.g., interaction ("guidance") of the upper and lower canines provides a disocclusion between the posterior teeth of opposing jaws when the lower jaw slides sideways with respect to the upper jaw in order to protect the posterior teeth). An appliance formed with bite adjustment structures on a canine cavity can adjust canine guidance by altering the interface between the canine cavity and a corresponding tooth on an opposing jaw so that when the jaws move sideways with respect to one another the interface between the bite adjustment structure and the opposing tooth protects the posterior teeth by providing a disocclusion (e.g., where, without the bite adjustment structure the posterior teeth may contact and/or grind against each other as the jaws move sideways with respect to one another).

Figure 5:
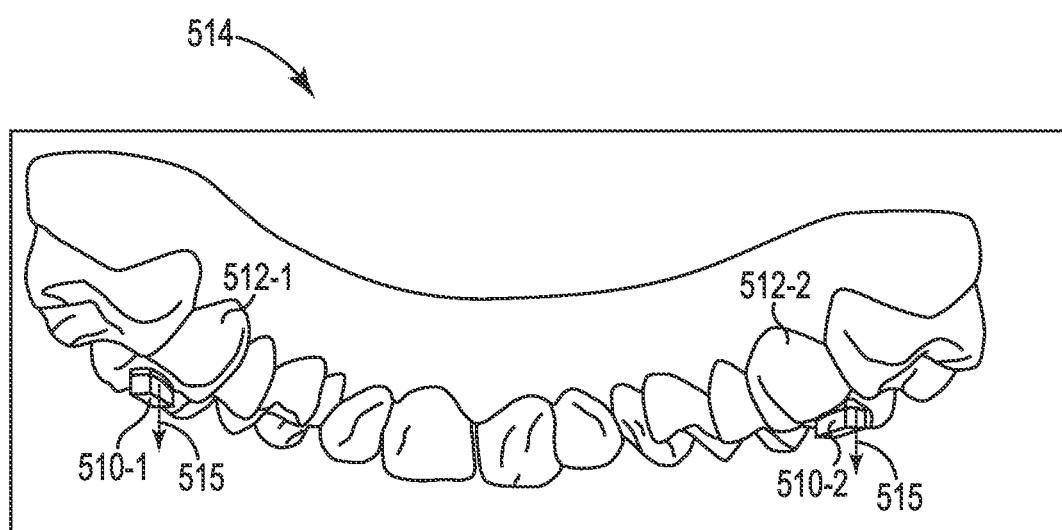
FIG. 5 illustrates a perspective view of a digital model of a jaw including a number of digital bite adjustment structures positioned on digital posterior teeth according to a number of embodiments of the present disclosure.

FIG. 5 illustrates a perspective view of a digital model 514 of a jaw including a number of digital bite adjustment structures 510-1, 510-2 positioned on digital posterior teeth 512-1, 512-2 according to a number of embodiments of the present disclosure. The digital bite adjustment structures 510 are illustrated being positioned on digital molars 512. Although not specifically illustrated, digital bite adjustment structures can be positioned on digital premolars in an analogous fashion to the digital bite adjustment structures 510 positioned on the molars 512 illustrated in FIG. 5.

The digital bite adjustment structures 510 can be positioned on a corresponding number of digital teeth 512 (e.g., posterior teeth) of a digital model 514 of a jaw at a particular stage of treatment. The position of the digital bite adjustment structures 510 can be adjusted for subsequent stages of treatment (e.g., to help effectuate a desired change to the digital model 514 of the jaw). For example, bite adjustment structures on cavities of an appliance over a molar and/or premolar can be used to provide a disocclusion between the posterior and/or anterior teeth of opposing jaws when the user bites. The digital bite adjustment structures 510 can extend from a respective cavity in a direction between the root and the tip of a tooth (gingival-incisal/coronal direction) 515. In some embodiments, the digital bite adjustment structures 510 can extend in the direction between the root and the tip of a tooth (gingival-incisal/coronal direction) 515 a distance sufficient to pass through an occlusal plane to help corresponding physical bite adjustment structures formed in an appliance based on the digital model 514 to provide a disocclusion. The disocclusion can be provided by interaction of the bite adjustment structure with teeth of the opposing jaw (e.g., the bite adjustment structure can contact a number of teeth of the opposing jaw and prevent the other teeth of the opposing jaws from contacting one another). Although not specifically illustrated, a corresponding surface of an opposite digital jaw can be contoured to receive the digital bite adjustment structure 510. An appliance formed thereover can inherit the contours so that the bite adjustment structure 510 fits nicely against the opposing appliance and avoids unwanted shifting forces.

Although not specifically illustrated, some embodiments can include a digital bite adjustment structure on a number of posterior teeth on only one side of the jaw (e.g., either left or right) for a particular stage of treatment. Including a bite adjustment structure extending from a posterior tooth on one side of the jaw can allow a number of teeth to be extruded from or erupt from an opposite side of the jaw. In some embodiments, a first stage of treatment can include a number of bite adjustment structures extending from posterior teeth on the left side of a jaw and a second stage subsequent to the first stage can include a number of bite adjustment structures extending from posterior teeth on the right side of the jaw (or vice versa). Varying the side of the jaw from which a digital bite adjustment structure extends (from a posterior tooth) can allow a number of teeth to be extruded from or erupt from both sides of the jaw alternately.

In some embodiments, a first stage of treatment can include a bite adjustment structure extending from a first posterior tooth on one side (e.g., left or right) of a jaw and a second stage subsequent to the first stage can include a bite adjustment structure extending from a second (different) posterior tooth on the same side of the jaw. Varying the tooth on the same side of the jaw from which a bite adjustment structure extends (from a posterior tooth) can allow a number of teeth to be extruded from or erupt from the same side of the jaw alternately.

Figure 6:
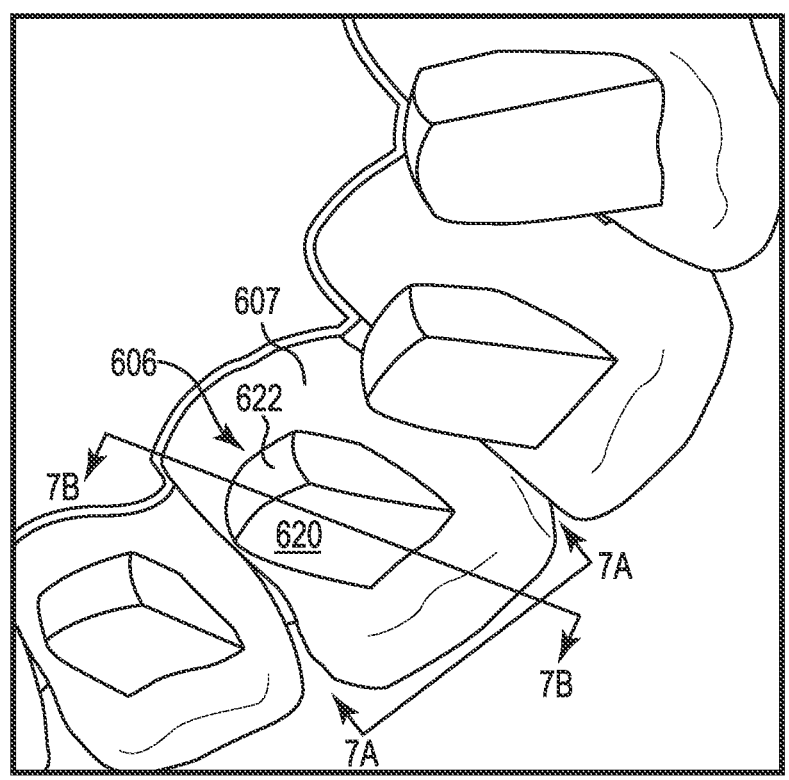
FIG. 6 illustrates a perspective view of a portion of a dental position adjustment appliance including a number of bite adjustment structures positioned thereon according to a number of embodiments of the present disclosure.
Figure 7D:
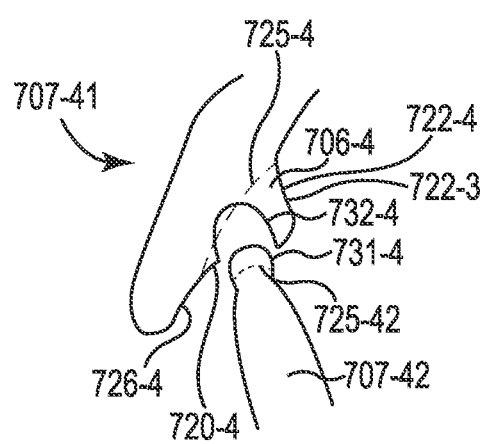
FIG. 7D illustrates a cross-section analogous to the cross-section illustrated in FIG. 7B of a portion of a first appliance and a second appliance according to a number of embodiments of the present disclosure.

FIG. 6 illustrates a perspective view of a portion of a dental position adjustment appliance including a number of bite adjustment structures 606 positioned thereon according to a number of embodiments of the present disclosure. For example, cavity 607 includes bite adjustment structure 606. Bite adjustment structure 606 includes a first surface 620 and a second surface 622. The cavity 607 that includes bite adjustment structure 606 is illustrated with cut line 7A-7A and cut line 7B-7B. FIG. 7A corresponds to cut line 7A-7A. FIGS. 7B, 7C, and 7D are different embodiments corresponding to cut line 7B-7B.

FIG. 7A illustrates a cross-section taken along cut line 7A-7A of a portion (e.g., cavity 707-1) of the appliance illustrated in FIG. 6 according to a number of embodiments of the present disclosure. The appliance includes a cavity 707-1 including a bite adjustment structure 706-1. The cavity 707-1 can be shaped to mate with two surfaces of a tooth therein when worn by a user. Note that the left and right edges of the cavity 707-1 are shown for illustrative purposes, and may not physically be part of the appliance (e.g., the appliance may have an open channel between adjacent cavities contained therein so as not to interfere with an interproximal region between adjacent teeth of a user). As described herein, bite adjustment structures can include a shape and location specific to a particular stage of a treatment plan. The bite adjustment structure 706-1 is illustrated on a back (lingual) surface 726-1 of the cavity 707-1. The cavity 707-1 (e.g., the bite adjustment structure 706-1 on the cavity 707-1) can have a first surface 720-1 extending away from a tooth within the cavity 707-1 in a front-to-back (facial-lingual) direction (out of the page) proximal to a biting (incisal) surface 724-1 of the cavity 707-1. The cavity 707-1 (e.g., the bite adjustment structure 706-1) can have a second surface 722-1 that connects with the first surface 720-1 a distance from the tooth within the cavity 707-1. The first surface 720-1 and the second surface 722-1 are both on a same side of the cavity 707-1 (e.g., the first surface 720-1 and the second surface 722-1 are both on the outside of the cavity 707-1 as opposed to the inside of the cavity 707-1 where a tooth is received). An angle 716 between the first surface 720-1 of the cavity 707-1 and an occlusal plane 718-1 of the user is illustrated.

According to a number of embodiments of the present disclosure, different cavities (not specifically illustrated in FIG. 7A) can have different angles 716 between the first surface 720-1 and the occlusal plane 718-1. Having different angles 716 between different bite adjustment structures 706-1 and the occlusal plane 718-1 can allow for more accurate modeling of forces applied to the bite adjustment structures 706-1 by opposing teeth of the user. Having different angles 716 between different bite adjustment structures 706-1 and the occlusal plane 718-1 can allow for more force to be applied to each of the bite adjustment structures 706-1 by opposing teeth of the user, for example, in a situation where a user has differently misaligned teeth in either an upper or lower jaw (e.g., where biting (incisal) surfaces 724-1 of different teeth approach the occlusal plane 718-1 with different angles). Modifying the angles 716 of individual bite adjustment structures 706-1 can allow first surfaces 720-1 (e.g., biting (incisal) surfaces) of individual bite adjustment structures 706-1 (e.g., each bite adjustment structure 706-1) to be substantially parallel to biting (incisal) surfaces of opposing teeth.

FIG. 7B illustrates a cross-section taken along cut line 7B-7B of a portion (e.g., cavity 707-2) of the appliance illustrated in FIG. 6 according to a number of embodiments of the present disclosure. With respect to FIG. 7A, FIG. 7B can illustrate the cavity 707-1 of FIG. 7A as it would appear after rotating 90 degrees about a vertical axis 721. The appliance includes a cavity 707-2 including a bite adjustment structure 706-2 according to a number of embodiments of the present disclosure. The cavity 707-2 can be shaped to mate with two surfaces of a tooth therein when worn by a user. For example, the front (facial) surface 728 of the cavity 707-2 can be shaped to mate with a front (facial) surface of a tooth therein and a biting (incisal) surface 724-2 of the cavity 707-2 can be shaped to mate with a biting (incisal) surface of a tooth therein. The back (lingual) surface 726-2 of the cavity 707-2 can be partially shaped to mate with a back (lingual) surface of a tooth therein.

The back (lingual) surface 726-2 of the cavity 707-2 is shaped to "partially mate" with a back (lingual) surface of a tooth therein, because there is a space between the tooth and the first surface 720-2 and second surface 722-2 of the bite adjustment structure 706-2 (e.g., as illustrated by the dotted line 725-2, which would otherwise represent a portion of the back (lingual) surface of the cavity 707-2). In some embodiments, the space between the tooth and the first surface 720-2 and the second surface 722-2 can be empty (e.g., hollow). In such embodiments, there is an open channel between the bite adjustment structure 706-2 and a remainder of the cavity 707-2. In some embodiments, the space between the tooth and the first surface 720-2 and the second surface 722-2 can be solid (e.g., filled with a same material as the appliance or a different material). In such embodiments, the dotted line 725-2 would appear as a solid line because it would represent a physical edge of the material filling the space between the tooth and the first surface 720-2 and the second surface 722-2.

The bite adjustment structure 706-2 is illustrated on a back (lingual) surface 726-2 of the cavity 707-2. The cavity 707-2 (e.g., the bite adjustment structure 706-2 on the cavity 707-2) can have a first surface 720-2 extending away from a tooth within the cavity 707-2 in a front-to-back (facial-lingual) direction proximal to a biting (incisal) surface 724-2 of the cavity 707-2. The cavity 707-2 (e.g., the bite adjustment structure 706-2) can have a second surface 722-2. The second surface 722-2 can extend away from a location where the back of a tooth to be received in the cavity 707-2 would be (e.g., as illustrated by dotted line 752-2). The second surface 722-2 can extend in a generally biting (incisal) direction (at least relative to the front-to-back (facial-lingual) direction in which the first surface 720-2 extends). The second surface 722-2 can depart from a point 727 where the cavity 707-2 is otherwise shaped to mate with a tooth received therein. The point 727 can be proximal to an edge 729 of the cavity 707-2 opposite the biting (incisal) surface 724-2 of the cavity 707-2. The first surface 720-2 connects with the second surface 722-2 a distance from the tooth within the cavity 707-2.

An angle 717 between the first surface 720-2 of the cavity 707-2 and an occlusal plane 718-2 of the user is illustrated. Contrasted with the angle 716 illustrated in FIG. 7A between the first surface 720-1 and the occlusal plane 718-1, which can be considered a "roll angle", the angle 717 illustrated in FIG. 7B between the first surface 720-2 and the occlusal plane 718-2 can be considered a "pitch angle." According to a number of embodiments of the present disclosure, different cavities (not specifically illustrated in FIG. 7B) can have different angles 717 between the first surface 720-2 and the occlusal plane 718-2. Having different angles 717 between different bite adjustment structures 706-2 and the occlusal plane 718-2 can allow for more accurate modeling of forces applied to the bite adjustment structures 706-2 by opposing teeth of the user. Having different angles 717 between different bite adjustment structures 706-2 and the occlusal plane 718-2 can allow for more accurate control of a direction in which force is to be applied to each of the bite adjustment structures 706-2 by opposing teeth of the user, for example, in a situation where a treatment plan for a user calls for repositioning a tooth within the cavity 707-3 in a direction other than directly toward the root and/or jaw (e.g., to correct for a tooth with improper tipping such as inclination or reclination).

FIG. 7C illustrates a cross-section analogous to the cross-section illustrated in FIG. 7B of a portion of a first appliance and a second appliance according to a number of embodiments of the present disclosure. The portion (e.g., cavity 707-31) of the first appliance includes a bite adjustment structure 706-3. The back (lingual) surface 726-3 of the cavity 707-31 can be shaped to mate partially with a back (lingual) surface of a tooth therein, because there is a space between the tooth and the first surface 720-3 and second surface 722-3 of the bite adjustment structure 706-3 (e.g., as illustrated by the dotted line 725-3, which would otherwise represent a portion of the back (lingual) surface of the cavity 707-31).

In some embodiments, the first surface 720-3 of the bite adjustment structure 706-3 can include a notch 730-3 therein positioned to receive a biting (incisal) surface of a cavity 707-32 opposite the bite adjustment structure 706-3 in an opposing jaw when the jaws of a user wearing the appliance are closed. Such a notch 730-3 can be useful in helping to control a location where an opposing cavity 707-32 contacts and/or applies force to the bite adjustment structure 706-3 so that the force applied to the bite adjustment structure is more accurately modeled in the treatment plan. Without such a notch, the opposing cavity 707-32 may slide along the first surface 720-3 of the bite adjustment structure 706-3 and apply forces to different portions of the first surface 720-3 of the bite adjustment structure 706-3, which can lead to different force vectors (e.g., different magnitudes and/or directions). More accurate modeling of the force applied to the bite adjustment structure 706-3 can lead to more favorable results from the treatment plan for the user (e.g., the actual results can more accurately reflect the modeled results in the treatment plan).

FIG. 7D illustrates a cross-section analogous to the cross-section illustrated in FIG. 7B of a portion of a first appliance and a second appliance according to a number of embodiments of the present disclosure. The portion (e.g., cavity 707-41) of the first appliance includes a bite adjustment structure 706-4. The back (lingual) surface 726-4 of the cavity 707-41 can be shaped to mate partially with a back (lingual) surface of a tooth therein, because there is a space between the tooth and the first surface 720-4 and second surface 722-4 of the bite adjustment structure 706-4 (e.g., as illustrated by the dotted line 725-4, which would otherwise represent a portion of the back (lingual) surface of the cavity 707-4).

In some embodiments, the first surface 720-4 of the bite adjustment structure 706-4 can include a receiving structure 732-4 therein positioned to receive a providing structure 731-4 of a cavity 707-42 opposite the bite adjustment structure 706-4 in an opposing jaw when the jaws of a user wearing the appliances are closed. Such a receiving structure 732-4 can be useful in helping to control a location where the opposing cavity 707-42 contacts and/or applies force to the bite adjustment structure 706-4 so that the force applied to the bite adjustment structure is more accurately modeled in the treatment plan. Without such a receiving structure, the opposing cavity 707-42 may slide along the first surface 720-4 of the bite adjustment structure 706-4 and apply forces to different portions of the first surface 720-4 of the bite adjustment structure 706-4, which can lead to different force vectors (e.g., different magnitudes and/or directions). More accurate modeling of the force applied to the bite adjustment structure 706-4 can lead to more favorable results from the treatment plan for the user (e.g., the actual results can more accurately reflect the modeled results in the treatment plan).

Figure 8:
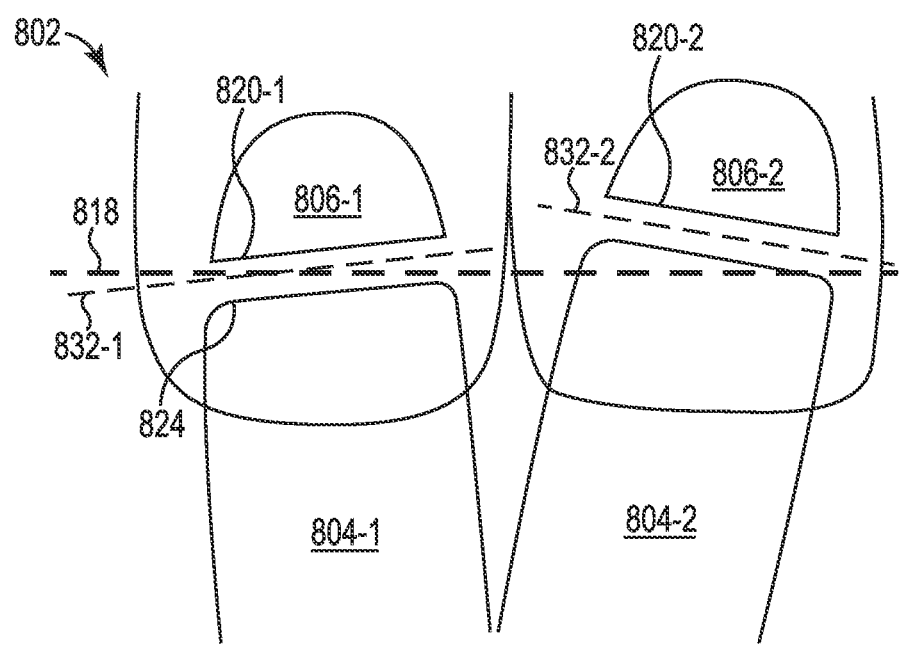
FIG. 8 illustrates an interface between a number of bite adjustment structures on a dental position adjustment appliance and a number of teeth on an opposing jaw according to a number of embodiments of the present disclosure.

FIG. 8 illustrates an interface between a number of bite adjustment structures 806-1, 806-2 on a dental position adjustment appliance 802 and a number of teeth 804-1, 804-2 on an opposing jaw according to a number of embodiments of the present disclosure. The number of teeth 804-1, 804-2 of the second jaw may or may not be covered by an appliance. The number of bite adjustment structures 806-1, 806-2 can have a shape and location specific to a particular stage of a treatment plan that the appliance 802 was designed to implement. Although only two cavities of the appliance 802 are illustrated, other cavities may be included with the appliance 802 and other cavities (some or all) can include bite adjustment structures thereon. A particular bite adjustment structure (e.g., bite adjustment structure 806-1, or more than one bite adjustment structure) can have a shape and location specific to a particular stage of the treatment plan based on at least one of an interface with a particular tooth (e.g., tooth 804-1) of the opposing jaw, an intended use, and an orientation of a tooth over which the cavity including the bite adjustment structure (e.g., bite adjustment structure 806-1) is positioned.

The interface between the bite adjustment structure 806-1 and the tooth 804-1 can be defined by a relative geometry of the first surface 820 of the bite adjustment structure 806-1 and the biting (incisal) surface 824 of the tooth 804-1 and/or a biting (incisal) surface of a cavity of an appliance thereover. The first surface 820-1 of the first cavity can be parallel to a local occlusal plane 832-1 of a tooth 804-1 opposite the first surface 820-1 of the first cavity and the first surface 820-2 of the second cavity can be parallel to a local occlusal plane 832-2 of a tooth 804-2 opposite the first surface 820-2 of the second cavity. A local occlusal plane can be an occlusal plane between a particular upper tooth and a particular lower tooth that is based only on the occlusion of the particular upper tooth and particular lower tooth (e.g., as opposed to a global occlusal plane, which is based on the occlusion of teeth in the upper and lower jaws as a whole). The first surface 820-1 of the bite adjustment structure 806-1 and/or the first surface 820-2 of the bite adjustment structure 806-2 can be designed to provide a disocclusion between opposing posterior teeth when the user bites.

Although not specifically illustrated, the teeth 804-1, 804-2 can be covered by an appliance that can include bite adjustment structures to interface with biting (incisal) surfaces of the cavities of the appliance 802. Various stages of a treatment plan can include or not include an appliance to cover the teeth 804-1, 804-2 of the opposing jaw and different stages of the treatment plan can include or not include a number of bite adjustment structures on the appliance for the opposing jaw. For example, a particular stage of a treatment plan can include an appliance over each of the upper jaw and lower jaw of a user, where each appliance includes a number of bite adjustment structures, and where the bite adjustment structures are designed to provide a disocclusion between opposing posterior teeth in order to level the teeth of the upper and lower jaws.

The positioning of the digital bite adjustment structures on the digital model can correspond to the actual position of the physical bite adjustment structures on the appliances that are fabricated according to the digital model. For example, as illustrated in FIG. 8, the bite adjustment structures 806-1, 806-2 (e.g., by operation of the user closing his jaws) may apply inherent forces 834-1, 834-2 to the teeth 804-1, 804-2 of the opposing jaw. As is also illustrated, the orientation of different teeth 804-1, 804-2 with respect to the orientation of different bite adjustment structures 806-1, 806-2 can be different based on the geometry of the interfaces between the bite adjustment structures 806-1, 806-2 and the opposing teeth 804-1, 804-2 according to a particular stage the treatment plan. Thus, the bite adjustment structures 806-1, 806-2 can be specific to individual teeth 804-1, 804-2 as well as specific to the particular stage of the treatment plan. The bite adjustment structures 806-1, 806-2 may direct an inherent force (e.g., inherent from the user biting) perpendicular to the local occlusal plane 832-1, 832-2 where the bite adjustment structures 806-1, 806-2 interact with opposing teeth 804-1, 804-2, an opposing appliance, and/or bite adjustment structures on an opposing appliance. In general there may not be lateral forces applied to the bite adjustment structures 806-1, 806-2 unless bite adjustment structures on an opposing appliance have been configured to apply such a force to the bite adjustment structures 806-1, 806-2.

Figure 9A:
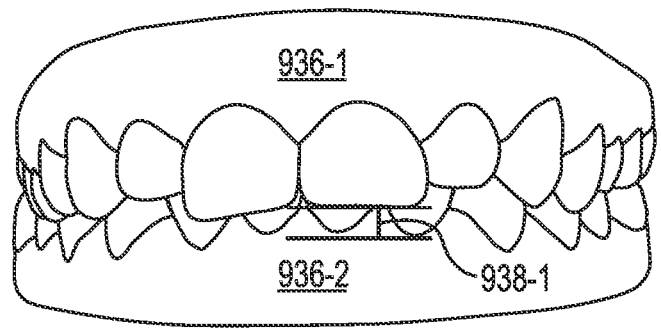
FIG. 9A illustrates jaws in a first vertical relationship according to a number of embodiments of the present disclosure.
Figure 9B:
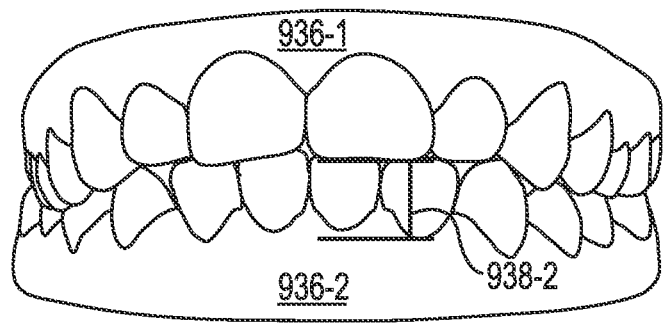
FIG. 9B illustrates jaws in a second vertical relationship according to a number of embodiments of the present disclosure.

FIG. 9A illustrates jaws 936-1, 936-2 in a first vertical relationship 938-1 according to a number of embodiments of the present disclosure. FIG. 9B illustrates jaws 936-1, 936-2 in a second vertical relationship 938-2 according to a number of embodiments of the present disclosure. In some embodiments, an appliance (e.g., including a number of bite adjustment structures) worn over the upper jaw 936-1 can be designed to adjust a vertical relationship 938-1, 938-2 between the upper jaw 936-1 and the lower jaw 936-2. As illustrated in FIG. 9A and FIG. 9B this adjustment of the vertical relationship 938-1, 938-2 can help correct for a deep bite to improve an appearance of the user's teeth and to reduce problems associated with a deep bite condition, as described herein. Embodiments are not limited to adjusting the position of the lower jaw 936-2 with respect to the upper jaw 936-1, as the position of either or both of the upper jaw 936-1 and lower jaw 936-2 can be adjusted. Furthermore, the adjustment can be performed by an appliance worn over the upper jaw 936-1 and/or an appliance worn over the lower jaw 936-2 (e.g., by interaction of a number of bite tabs on a number of appliances with a number of teeth on an opposing jaw).

Figure 10:
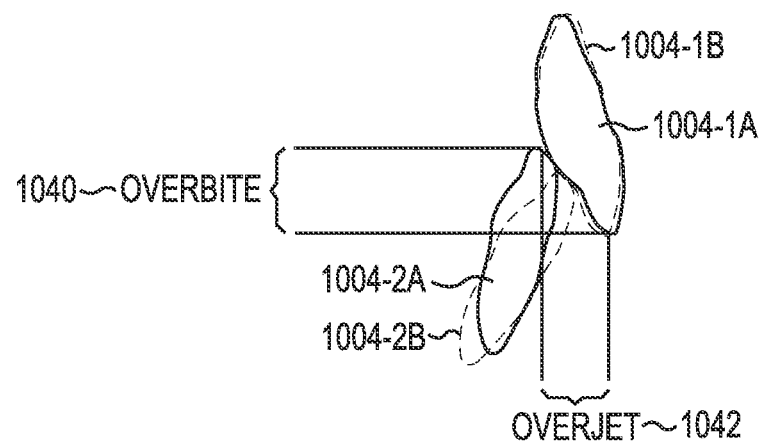
FIG. 10 illustrates a correction for overbite and overjet according to a number of embodiments of the present disclosure.

FIG. 10 illustrates a correction for overbite 1040 and overjet 1042 according to a number of embodiments of the present disclosure. Overbite 1040 can refer to a lower jaw being too far behind the upper jaw or a misalignment of the teeth. Specifically, overbite 1040 can refer to the extent of vertical (superior-inferior) overlap of the maxillary central incisors 1004-1 over the mandibular central incisors 1004-2, measured relative to the incisal ridges. Over jet 1042 can be the distance between the maxillary anterior teeth 1004-1 and the mandibular anterior teeth 1004-2 in the anterior-posterior axis. As illustrated in FIG. 10, the maxillary tooth 1004-1 can be adjusted from a first position 1004-1A to a second position 1004-1B and/or the mandibular tooth 1004-2 can be adjusted from a first position 1004-2A to a second position 1004-2B.

A number of appliances in a series of appliances created as part of a treatment plan can perform different functions. Some of the functions performed by different appliances in the series may overlap and some may be unique to a particular appliance. By way of example, a first appliance can include a first number of bite adjustment structures designed to provide a disocclusion for a number of teeth of a first jaw and/or a second jaw to help correct for at least one of overjet 1042 and overbite 1040. A second appliance can include a second number of bite adjustment structures designed to provide a disocclusion for the number of teeth of the first jaw and/or the second jaw to correct for at least one of overjet 1042 and overbite 1040. In this example, the first appliance can correct for either or both of overjet 1042 and overbite 1040 and the second appliance can correct for either or both of overjet 1042 and overbite 1040. Correction for overbite and/or overjet can include adjustments to the position of various teeth and or relative positioning of the jaws by the appliances (e.g., including adjustments affected by the number of bite adjustment structures, as described herein). Such adjustments can include intrusion, rotation, inclination, and/or disocclusion, among others.

Figure 11:
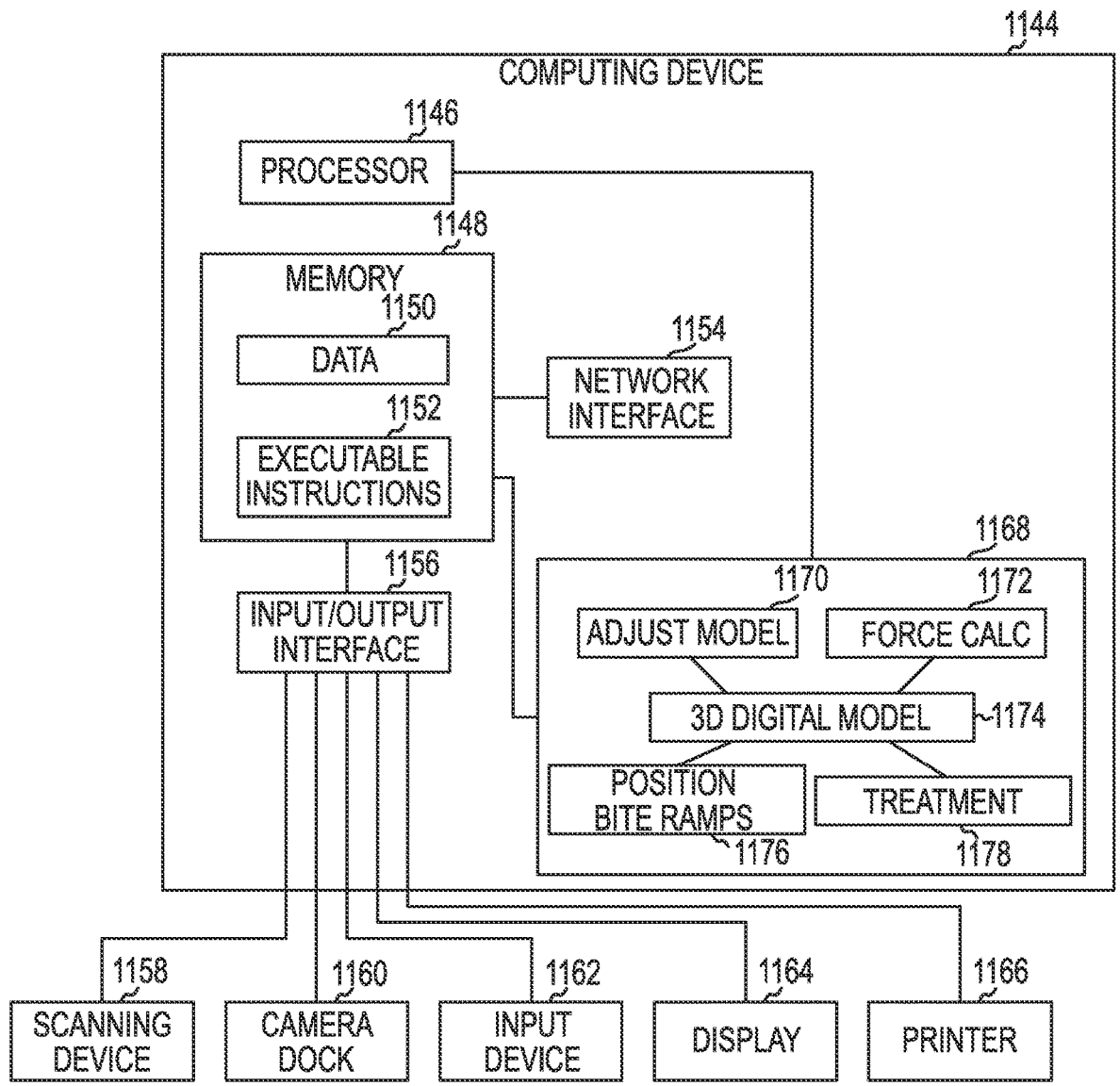
FIG. 11 illustrates a system for treatment plan specific bite adjustment structures according to one or more embodiments of the present disclosure.

FIG. 11 illustrates a system for treatment plan specific bite adjustment structures according to one or more embodiments of the present disclosure. In the system illustrated in FIG. 11, the system includes a computing device 1144 having a number of components coupled thereto. The computing device 1144 includes a processor 1146 and memory 1148. The memory can include various types of information including data 1150 and executable instructions 1152 as discussed herein.

Memory and/or the processor may be located on the computing device 1144 or off the device in some embodiments. As such, as illustrated in the embodiment of FIG. 11, a system can include a network interface 1154. Such an interface can allow for processing on another networked computing device or such devices can be used to obtain information about the patient or executable instructions for use with various embodiments provided herein.

As illustrated in the embodiment of FIG. 11, a system can include one or more input and/or output interfaces 1156. Such interfaces can be used to connect the computing device with one or more input or output devices.

For example, in the embodiment illustrated in FIG. 11, the system includes connectivity to a scanning device 1158, a camera dock 1160, an input device 1162 (e.g., a keyboard, mouse, etc.), a display device 1164 (e.g., a monitor), and a printer 1166. The processor 1146 can be configured to provide a visual indication of a digital model 1174 on the display 1164 (e.g., on a GUI running on the processor 1146 and visible on the display 1164). The input/output interface 1156 can receive data, storable in the data storage device (e.g., memory 1148), representing the digital model 1174 (e.g., corresponding to the patient's upper jaw and the patient's lower jaw).

In some embodiments, the scanning device 1158 can be configured to scan a physical mold of a patient's upper jaw and a physical mold of a patient's lower jaw. In one or more embodiments, the scanning device 1158 can be configured to scan the patient's upper and/or lower jaws directly (e.g., intraorally).

The camera dock 1160 can receive an input from an imaging device (e.g., a 2D imaging device) such as a digital camera or a printed photograph scanner. The input from the imaging device can be stored in the data storage device 1148.

Such connectivity can allow for the input and/or output of digital model 1174 information or instructions (e.g., input via keyboard) among other types of information. Although some embodiments may be distributed among various computing devices within one or more networks, such systems as illustrated in FIG. 11 can be beneficial in allowing for the capture, calculation, and/or analysis of information discussed herein.

The processor 1146, in association with the data storage device 1148, can be associated with data and/or application modules 1168. The processor 1146, in association with the data storage device 1148, can store and/or utilize data and/or execute instructions to provide a number of application modules for treatment plan specific bite adjustment structures.

Such data can include the digital model 1174 described herein (e.g., including a first jaw, a second jaw, a number of appliances, etc.). Such application modules can include an adjustment module 1170, a force calculation module 1172, a position bite adjustment structures module 1176, and/or a treatment plan module 1178.

The position bite adjustment structures module 1176 can be configured to position a number of bite adjustment structures on a corresponding number of digital teeth (e.g., anterior teeth) of the digital model 1174 of a jaw at a first stage of a treatment plan. The position module 1176 can be configured to incorporate a result of forces modeled by the force calculation module 1172 (e.g., forces used to reposition the corresponding number of digital teeth a first distance according to a first stage of the treatment plan).

The adjustment module 1170 can be configured to adjust the position of the number of bite adjustment structures on the corresponding number of digital teeth of the digital model 1174 of the jaw at a second stage of the treatment plan according to changes to the digital model 1174 of the jaw between the first stage and the second stage of the treatment plan. The adjustment module 1170 can be configured to adjust the position of the number of digital bite adjustment structures by changing a shape (e.g., size, a number of angles, etc.) and/or an attachment location of the number of digital bite adjustment structures on the corresponding number of digital teeth of the digital model of the jaw. The adjustment module 1170 can be configured to adjust a shape of the digital model 1174 of the jaw at the first stage of the treatment plan such that the corresponding one of the appliances formed thereover distributes a counterforce corresponding to the force modeled by the force calculation module 1172 to a number of posterior teeth of the user's jaw. The adjustment module 1170 can be configured to incorporate a result of forces modeled by the force calculation module 1172 (e.g., forces used to reposition the corresponding number of digital teeth a second distance according to a second stage of the treatment plan).

The force calculation module 1172 can be configured to model an inherent force applied to the number of bite adjustment structures by a user wearing a corresponding one of the appliances during the first stage of the treatment plan. The treatment plan module 1178 can be configured to create, edit, delete, revise, or otherwise modify the treatment plan (e.g., based at least in part on operation of other application modules 1168).

The digital model 1174 can be provided (e.g., via network interface 1154) for fabrication of physical models corresponding to the jaw at the first and the second stages of the treatment plan for formation of appliances thereover such that the appliances inherit a shape of the number of digital bite adjustment structures.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the use of the terms "a", "an", "one or more", "a number of", or "at least one" are all to be interpreted as meaning one or more of an item is present. Additionally, it is to be understood that the above description has been made in an illustrative fashion, and not a restrictive one. Combination of the above embodiments, and other embodiments not specifically described herein will be apparent to those of skill in the art upon reviewing the above description.

It will be understood that when an element is referred to as being "on," "connected to" or "coupled with" another element, it can be directly on, connected, or coupled with the other element or intervening elements may be present. In contrast, when an element is referred to as being "directly on," "directly connected to" or "directly coupled with" another element, there are no intervening elements or layers present. As used herein, the term "and/or" includes any and all combinations of one or more of the associated listed items.

It will be understood that, although the terms first, second, etc. may be used herein to describe various elements and that these elements should not be limited by these terms. These terms are only used to distinguish one element from another element. Thus, a first element could be termed a second element without departing from the teachings of the present disclosure.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
generating a first digital model of a first physical model associated with a first appliance of a first stage of a treatment plan to incrementally reposition the teeth of a patient, the first appliance including a plurality of cavities therein to receive respective teeth of a first jaw and a plurality of first bite adjustment structures extending from a respective one of the cavities, a first bite adjustment structure of the plurality of first bite adjustment structures being customized for its respective tooth and having an edge where the first bite adjustment structure of the plurality of first bite adjustment structures meets the respective tooth receiving cavity, the edge of the first bite adjustment structure of the first plurality of bite adjustment structures located at a first distance from an incisal surface of the respective cavity, and having a respective first planar surface thereby allowing a respective contacting tooth of a second jaw to slide along the respective planar surface;
generating a second digital model of a second physical model associated with a second appliance of a second stage of treatment plan to incrementally reposition the teeth of a patient, the second appliance including a plurality of cavities therein to receive respective teeth of the first jaw and a plurality of second bite adjustment structures extending from a respective one of the cavities, a first bite adjustment structure of the plurality of second bite adjustment structures being customized for its respective tooth and having an edge where the first bite adjustment structure of the second plurality of bite adjustment structures meets the respective tooth receiving cavity, the edge of first bite adjustment structure of the second plurality of bite adjustment structures located at a second distance, different from the first distance, from an incisal surface of the respective cavity, and having a respective second planar surface thereby allowing a respective contacting tooth of a second jaw to slide along the respective planar surface; and
outputting the digital models of the first physical model and the second physical model for fabrication of the first appliance and the second appliance;
fabricating the first appliance based on the first digital model, the appliance including the first bite adjustment structure of the plurality of first bite adjustment structures and having the respective first planar surface; and
fabricating the second appliance based on the second digital model, the appliance including the first bite adjustment structure of the plurality of second bite adjustment structures and having the respective second planar surface.

2. The method of claim 1, wherein the first planar surface is parallel to an occlusal plane of the patient.

3. The method of claim 1, wherein the first planar surface is parallel to a local occlusal plane.

4. The method of claim 1, wherein the first bite adjustment structure of the plurality of first bite adjustment structures is customized for an incisor.

5. The method of claim 1, wherein the first bite adjustment structure of the plurality of first bite adjustment structures is customized for a canine.

6. The method of claim 5, wherein an interface between the first bite adjustment structure of the plurality of first bite adjustment structures and a corresponding tooth of the second jaw provides disocclusion when the first jaw and second jaw move sideways with respect to each other.

7. The method of claim 5, wherein the first planar surface is oblique to an occlusal plane.

8. The method of claim 1, wherein the first bite adjustment structure of the plurality of first bite adjustment structures is customized for a premolar or molar.

9. The method of claim 8, wherein the first planar surface is perpendicular to an occlusal plane.

10. The method of claim 1, wherein being customized for a respective tooth includes having a position and orientation based on the respective tooth.

11. The method of claim 1, wherein being customized for each respective tooth includes being shaped and positioned based on a corresponding tooth of an opposing jaw.

12. The method of claim 11, wherein the first distance is based on an interface with the respective contacting tooth of the second jaw when the first appliance is worn and the first and second jaws are in occlusion.

13. The method of claim 1, wherein the plurality of first bite adjustment structures and the plurality of second bite adjustment structures extend from respective cavities of the respective appliance that receive anterior teeth.

14. The method of claim 13, wherein the second distance is closer to an incisal surface of the respective cavity than the first distances of the first plurality of bite adjustment structures.

15. The method of claim 1, wherein the first bite adjustment structure of the first plurality of bite adjustment structures extends from a cavity of the first shell appliance that receives anterior teeth, and wherein the first bite adjustment structure of the first plurality of bite adjustment structures provides a disocclusion between the first jaw and the second jaw when the first appliance is worn by the patient.

16. The method of claim 1, wherein the first bite adjustment structure of the first plurality of bite adjustment structures is configured to have a first shape and a first of the second plurality of bite adjustment structures is configured to have the first shape.

17. A system, comprising:
a first appliance of a series of appliances to incrementally implement a treatment plan for a patient having a first jaw and a second jaw, comprising a first shell having a plurality of cavities therein to receive respective teeth of the first jaw and being for a first stage of the treatment plan;
a plurality of first bite adjustment structures formed of a same material of the first shell and extending from a respective one of the cavities, a first of the plurality of bite adjustment structures is customized for its respective tooth and having an edge where the first of the plurality of bite adjustment structures meets the respective tooth receiving cavity, the edge of first of the plurality of bite adjustment structures located at a first distance from an incisal surface of the respective cavity, and having a respective first planar surface thereby allowing a respective contacting tooth of the second jaw to slide along the respective planar surface;
a second appliance of the series of appliances to incrementally implement a treatment plan, comprising a first shell having a plurality of cavities therein to receive respective teeth of the first jaw and being for a second stage of the treatment plan; and
a plurality of second bite adjustment structures formed of a same material of the second shell and extending from a respective one of the cavities, a first of the plurality of second bite adjustment structures being customized for its respective tooth and having an edge where the first of the second plurality of bite adjustment structures meets the respective tooth receiving cavity, the edge of the first of the second plurality of bite adjustment structures located at a second distance, different from the first distance, from an incisal surface of the respective cavity, and having a respective second planar surface thereby allowing a respective contacting tooth of the second jaw to slide along the respective planar surface.

18. The system of claim 17, wherein the first planar surface is parallel to an occlusal plane.

19. The system of claim 17, wherein being customized for a respective tooth includes having a position and orientation based on the respective tooth.

20. The system of claim 17, wherein being customized for each respective tooth includes being shaped and positioned based on a corresponding tooth of the opposing jaw.

21. A method, comprising:
generating a first digital model of a first physical model associated with a first stage of a treatment plan to incrementally reposition the teeth of a first jaw of a patient, the first digital model configured to include a plurality of digital teeth and a plurality of first bite adjustment structure digital models, each extending from a respective one of the digital teeth, a first bite adjustment structure digital model of the plurality of first bite adjustment structure digital models being customized for its respective tooth and having an edge where the first bite adjustment structure digital model of the plurality of first bite adjustment structure digital models meets the respective tooth, the edge of the first bite adjustment structure digital model of the first plurality of bite adjustment structure digital models located at a first distance from an incisal surface of the respective tooth, and having a respective digital first planar surface;
generating a second digital model of a second physical model associated with a second stage of treatment plan to incrementally reposition the teeth of a patient, the second digital model configured to include a plurality of digital teeth therein and a plurality of second bite adjustment structure digital models, each extending from a respective one of the teeth, a first bite adjustment structure digital model of the plurality of second bite adjustment structure digital models being customized for its respective tooth and having an edge where the first bite adjustment structure digital model of the second plurality of bite adjustment structure digital models meets the respective tooth, the edge of first bite adjustment structure of the second plurality of bite adjustment structures located at a second distance, different from the first distance, from an incisal surface of the respective tooth, and having a respective digital second planar surface; and
fabricating the first physical model based on the first digital model, the first physical model having a first planar surface corresponding to the digital first planar surface of the first digital model;
fabricating the second physical model based on the second digital, model, the second physical model having a second planar surface corresponding to the digital second planar surface of the second digital model;
forming a first appliance using the first physical model, the first appliance having a first physical planar surface corresponding to the first planar surface of the first physical model and being shaped to receive a respective contacting tooth of a second jaw to slide along the first physical planar surface; and
forming a second dental appliance using the second physical model, the second appliance having a second physical planar surface corresponding to the first planar surface of the first physical model and being shaped to receive a respective contacting tooth of the second jaw to slide along the respective planar surface.

22. The method of claim 21, wherein the first respective planar surface is parallel to an occlusal plane of the patient.

23. The method of claim 21, wherein the first respective planar surface is parallel to a local occlusal plane.

24. The method of claim 21, wherein the first of the plurality of bite adjustment structure digital models is customized for an incisor.

25. The method of claim 21, wherein the first of the plurality of bite adjustment structure digital models is customized for a canine.

26. The method of claim 25, wherein an interface between the first of the plurality of bite adjustment structure of the first appliance and a corresponding tooth of the second jaw is configured to provide disocclusion when the first appliance is worn and the first jaw and second jaw move sideways with respect to each other.

27. The method of claim 25, wherein the first respective planar surface is oblique to the occlusal plane.

28. The method of claim 21, wherein the first of the plurality of bite adjustment structure digital models is customized for a premolar or molar.

29. The method of claim 28, wherein the first respective planar surface is perpendicular to the occlusal plane.

30. The method of claim 21, wherein being customized for a respective tooth includes having a position and orientation based on the respective tooth.

\* \* \* \* \*